June 6, 1967  P. B. OLMSTED  3,323,421
CONTROL FOR HYDRAULIC ACTUATOR
Filed May 21, 1965  4 Sheets-Sheet 2
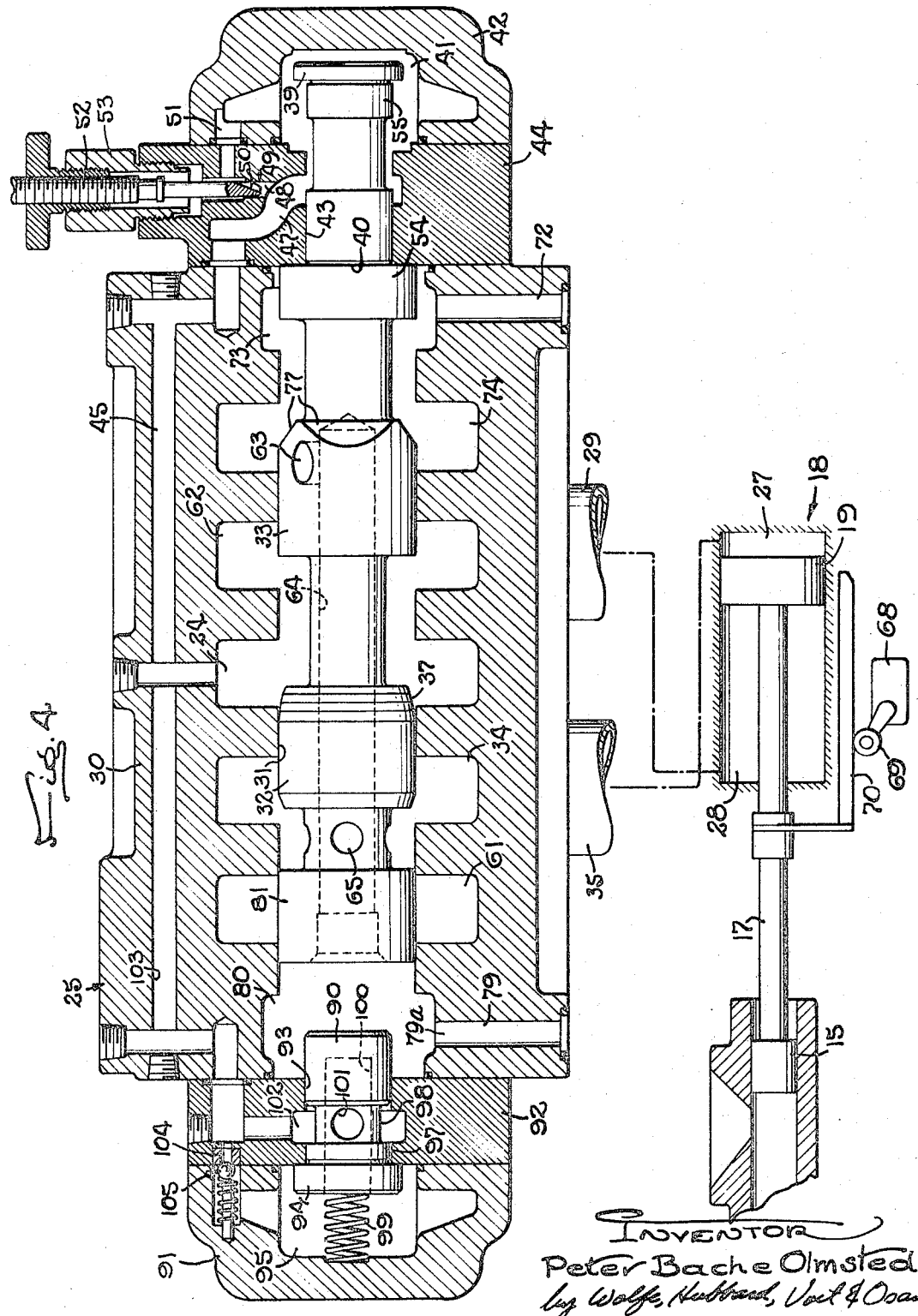
INVENTOR
Peter Bache Olmsted
by Wolfe, Hubbard, Voit & Osann
ATTORNEY

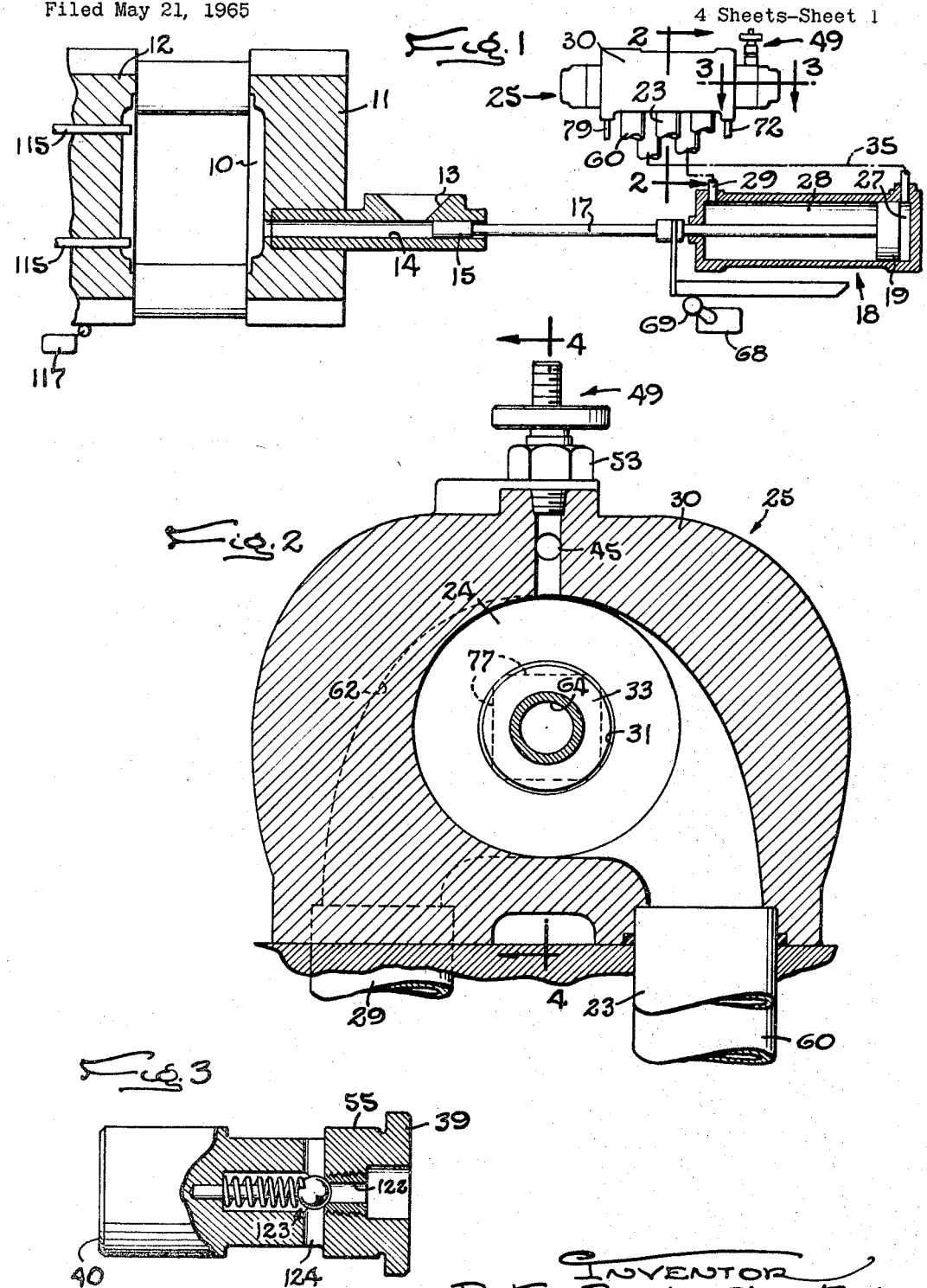

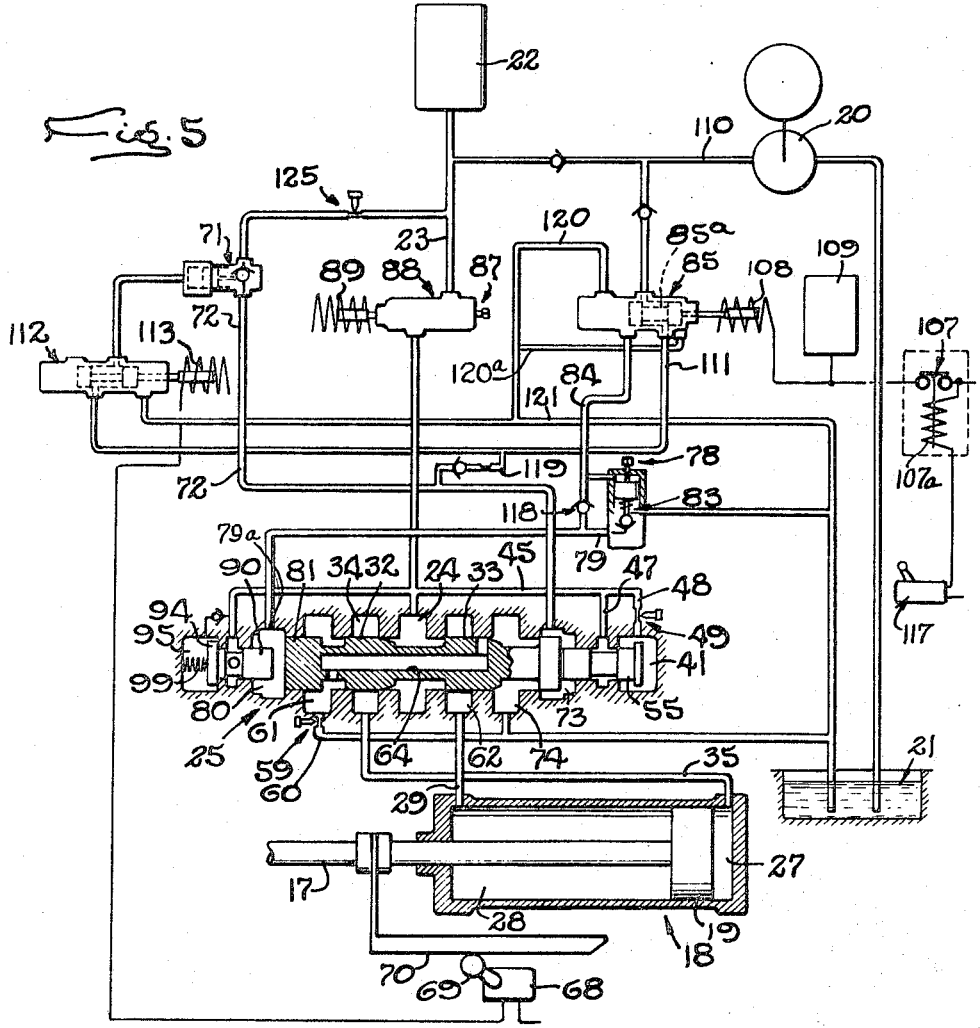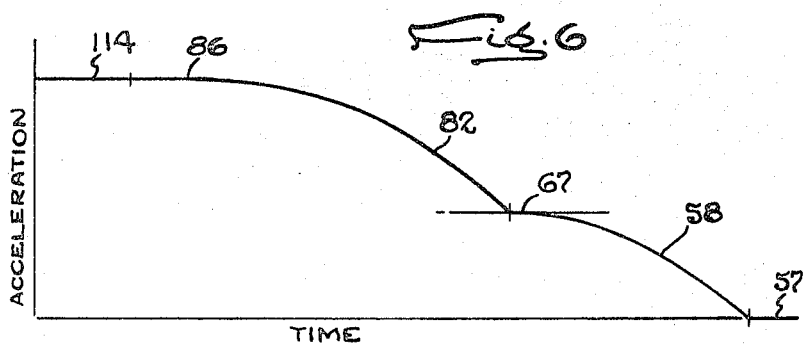

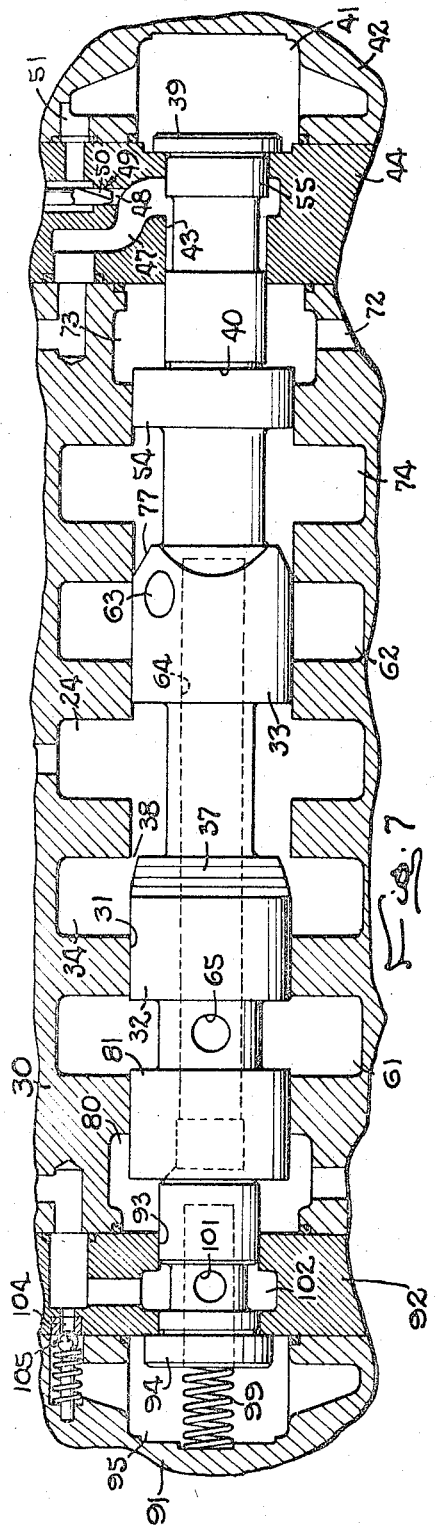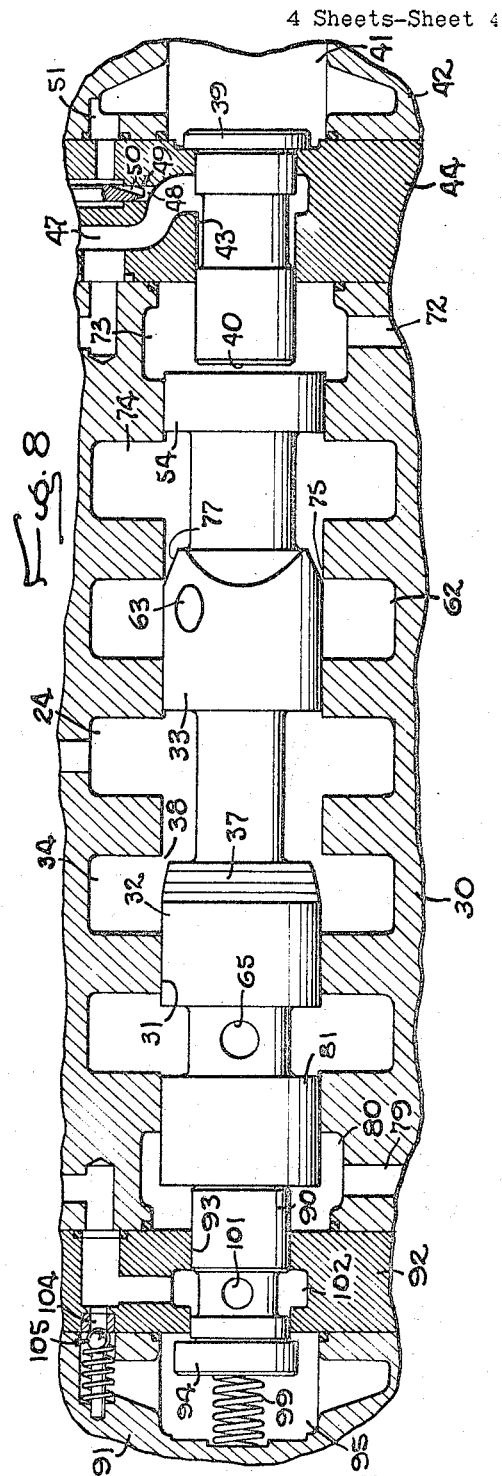

United States Patent Office 3,323,421
Patented June 6, 1967

3,323,421
CONTROL FOR HYDRAULIC ACTUATOR
Peter Bache Olmsted, Ann Arbor, Mich., assignor to Greenlee Bros. & Co., Rockford, Ill., a corporation of Illinois
Filed May 21, 1965, Ser. No. 457,622
9 Claims. (Cl. 91—359)

This invention relates to the control of hydraulic actuators and, more particularly, to a control for the hydraulically actuated injection plunger of a die-casting machine.

In the injection molding process, a charge of metal is fed into an injection chamber through a port therein, and then is injected into the closed mold cavity or cavities by the plunger which moves into the chamber and forces the molten metal into the cavity with considerable pressure. Initially, the plunger moves at a relatively slow rate to close the feed port and begin filling the cavity, and then moves considerably faster to complete the filling and apply high pressure on the metal in the cavity. To adapt the machine for use with different types of metals and various sizes and shapes of mold cavities, the velocity and rate of acceleration of the plunger are selectively variable to produce different rates of flow of metal into the mold cavity.

One control of this type is shown in Patent No. 3,159,375 in which pressure fluid is admitted at a variable rate into the hydraulic cylinder through a control valve having a valve member for opening the input to the cylinder in controlled steps. The high and low speeds of the injection plunger are determined by adjustable stops engageable with the valve member at different points along its path to stop the valve member when the valve has been opened to a selected degree.

The general object of the present invention is to provide a new and improved control using a control valve of simplified construction with which the plunger velocity and acceleration may be precisely controlled and easily adjusted to obtain the cycle desired for optimum filling of cavities of different types.

Another object is to eliminate the relatively complex mechanically positioned stops of the patented valve while maintaining the function of the stops.

A further object is to provide an extremely versatile control of the foregoing character using a relatively simple control valve.

Other objects and advantages of the invention will become apparent from the following detailed description taken in connection with the accompanying drawings, in which FIGURE 1 is a fragmentary schematic view, partly in cross-section and partly in side elevation, of part of a die-casting machine embodying the novel features of the present invention.

FIG. 2 is an enlarged fragmentary cross-sectional view taken along the line 2—2 of FIG. 1.

FIG. 3 is an enlarged view taken substantially along the line 3—3 of FIG. 1 and showing one of the pilot pistons partially broken away and shown in cross-section.

FIG. 4 is a fragmentary cross-sectional view taken substantially along the line 4—4 of FIG. 2.

FIG. 5 is a schematic diagram showing the basic elements of the hydraulic control.

FIG. 6 is a graph illustrating the rate of acceleration of the injection plunger during different portions of the injection stroke.

FIG. 7 is a view similar to part of FIG. 4 with the parts in moved positions.

FIG. 8 is a view similar to FIG. 7 showing still another condition of the parts.

As shown in the drawings for purposes of illustration, the invention is incorporated in a die-casting machine for injecting molten metal into a mold cavity 10 (FIG. 1) defined between two separable die members 11 and 12 adapted to be clamped together in the manner well known in the art. In this instance, the die 11 is fixed and the die 12 is movable toward the fixed die from the position shown in FIG. 1 to close the cavity. The illustrative machine is of the cold-chamber type in which molten metal is ladled through an upwardly opening port 13 into a horizontal bore 14 forming an injection cylinder communicating at its left end with the mold cavity through the fixed die 11. Slidably guided in the right end portion of the cylinder 14 is a hydraulically actuated plunger 15 which moves through the chamber toward the mold cavity to force the molten metal into the cavity.

As shown in FIG. 1, the injection plunger 15 is carried on one end of a rod 17 projecting into the so-called shot cylinder 18 of the reciprocating hydraulic actuator for operating the plunger, the rod being connected at its other end to a piston 19 fitted in the cylinder and movable therein toward and away from the injection chamber 14. Pressure fluid for operating this actuator is supplied by a suitable source such as a motor-driven pump 20 (FIG. 5) which draws fluid, usually oil, from a sump 21 and charges an accumulator 22 capable of storing a large volume of fluid under pressure for delivery to the cylinder 18. The accumulator communicates through a supply line 23 with the pressure port 24 of a control valve 25 for delivering oil to the head end 27 of the shot cylinder during the forward or injection stroke at rates which determine the varying velocity of the piston 19 and the injection plunger 15. Fluid exhausted from the rod end 28 of the shot cylinder during the forward stroke flows through a line 29 communicating through the control valve with the sump. To retract the plunger upon completion of the forward stroke, the exhaust line 29 is connected through the control valve to the supply line 23 to carry pressure fluid into the rod end of the shot cylinder and return the piston to the position shown in FIGS. 1 and 5.

The control valve 25 comprises a hollow valve body 30 with a valve member in the form of a spool guided in a cylindrical bore 31 defining the interior of the body, for endwise sliding movement relative to the body and a plurality of annular chambers or ports spaced along the bore. During movement of the spool in one direction, to the left herein, the spool opens and closes the ports in accordance with a preselected program and thereby produces the desired sequence of machine operation.

It will be seen in FIG. 5 that the supply line 23 communicates directly with the pressure port 24 which is located approximately midway between the ends of the body and between two heads 32 and 33 of the spool. Initially, the input port 34 communicating with the head end of the shot cylinder through a line 35 is closed by the head 32. As in the patented valve, the input port is opened progressively to the pressure port by movement of the spool to begin admitting fluid to the head end at a very slow rate and start the plunger slowly forward after the injection cylinder 14 has been filled or substantially filled with molten metal. Such opening of the input port is accomplished by moving the spool to the left from the start position shown in FIG. 5 at a preselected speed to move the beveled right end 37 of the head into the input port and begin opening a passage 38 (FIGS. 7 and 2) around the right end of the head for the flow of oil from the pressure port into the input port and thence into the head end of the cylinder.

As the cross-sectional area of this passage 38 increases, the rate of flow to the shot cylinder 18 increases to increase the velocity of the piston 19 and the plunger 15. The rate of increase in the cross-sectional area, of course, depends upon the endwise speed of the spool and the slope of the beveled head end 37 which preferably is formed by a series of inclined steps turned on the end of the head. Thus, the rate of acceleration of the injection plunger may be varied during different portions of the injection stroke by varying the endwise velocity of the spool.

Such variation of the plunger velocity is important to the proper injection of the molten metal into the mold cavity 10 in order to produce the proper gate velocity of the molten metal entering the cavity. For cavities of different sizes and shapes, different gate velocities are used for optimum flow into each cavity. Moreover, the injection plunger 15 usually is advanced past the feed port 13 at a relatively low speed for the so-called slow-shot portion of the cycle, and then is accelerated into the final or fast-shot portion of the cycle. The factors that determine optimum speeds and acceleration rates are well known to those skilled in the art.

The present invention contemplates a novel hydraulic system for controlling and selectively varying the speed and acceleration of the injection plunger 15 to produce a carefuly programmed injection stroke that is best suited for the particular mold cavity 10 being used. With the novel system, the acceleration of the plunger during the slow shot, the maximum velocity of the plunger at the end of the slow shot, the acceleration of the plunger during the fast shot, and the maximum velocity of the plunger at the end of the fast shot are easily and independently adjustable to obtain the desired injection flow throughout the injection stroke.

In this instance, the relatively slow motion of the valve spool for the initial slow shot is produced by a pilot piston slidably guided in a cylinder mounted on the right end of the valve body 30 with a head 39 on its right end exposed to pilot pressure fluid in the cylinder and its other end 40 positioned to engage the right end of the valve spool and push the latter to the left as the pilot piston moves to the left. As shown most clearly in FIG. 4, the cylinder is defined by the interior 41 of a hollow cup 42 and the center bore 43 of a ring 44 disposed between the cup and the right end of the valve body, both the cup and the ring being bolted to the valve body with the bore in the ring coaxial with the bore 31 defining the interior of the valve body. The left end of the pilot piston is fitted snugly in the ring bore and the head is disposed within the enlarged pressure chamber defined by the interior 41 of the cup.

To shift the pilot piston to the left at the beginning of the operation, pilot pressure fluid is admitted into the chamber 41 through a passage 45 communicating at one end with the supply line 23 and at the other end with a passage 47 (see FIG. 4) in the ring 44 opening into the bore 43 behind the left end portion of the piston. A branch passage 48 communicates directly with the pressure chamber 41 past a selectively adjustable flow restrictor 49 which controls the rate of fluid flow through the branch passage to the pressure chamber.

As shown in FIG. 4, the flow restrictor 49 is a rod having a notched lower end fitted snugly within the lower portion of the branch passage and adjustable endwise in the passage to vary the flow through the notch 50 into a horizontal portion 51 of the branch passage and thence into the chamber 41. For this purpose, the upper end portion of the rod is threaded through a plug 52 threaded into a sleeve 53 which is threaded into a tapped hole in the top of the ring 44 to support the rod for vertical movement. Thus, by turning the rod, the effective area of the branch passage, as determined by the position of the notch relative to horizontal portion of the passage may be varied to select precisely the desired rate of flow through the passage for a given system pressure.

I will be seen that the right end of the valve spool is formed with a head 54 which abuts against the ring 44 around the bore 43 in the initial position of the spool, and the main pilot passage 47 communicates with the pressure chamber 41 through the ring bore. Thus, oil from the supply line 23 flows into the pressure chamber through both passages 47 and 48 to urge the pilot piston to the left from the retracted position until the right end of the bore is closed by a head 55 formed on the plunger adjacent its right end. This head is smaller in diameter than the head 39 and is sized to fit snugly in the bore 43. When the head enters the bore, the open inner end of the passage 47 is blocked and fluid can flow into the pressure chamber 41 only past the flow restrictor 49 which thereafter controls the rate of flow to the chamber and thus determines the velocity of the piston and the spool. The rapid initial flow rate is used to shift the valve spool idly from its initial position in FIG. 4 to the starting position in FIG. 5 at a rapid rate preparatory to the effective portion of the spool motion. This presetting motion is indicated at 57 in FIG. 6 where it will be seen that the velocity of the injection plunger is not affected. The slower flow into the chamber begins in the start position of the spool just prior to the opening of the input passage 38 around the spool head 32 and thus controls the motion of the spool during the slow shot of the injection plunger indicated at 58 in FIG. 6.

With the valve spool moving at a constant and relatively low velocity, the input passage 38 around the head 32 is opened progressively at the slow rate to gradually increase the area of the input passage and thus increase the velocity of the injection plunger 15 along the line 58 in FIG. 6. The slope of this line, of course, depends upon the speed of endwise movement of the spool and thus may be varied by adjustment of the flow restrictor 49. Increases and decreases in the effective area of the branch passage 51 through the notch 50 respectively increase and decrease the slow speed of the spool and the rate of acceleration of the plunger.

To limit the maximum velocity attained by the injection plunger 15 during the slow shot, the control limits the maximum rate of flow of exhaust fluid from the rod end 28 of the shot cylinder 18. This is accomplished by an adjustable flow restrictor 59 (FIG. 5) in a drain line 60 communicating with the drain port 61 of the valve. Initially, the rod end of the shot cylinder communicates through an exhaust port 62 and the pressure port 24 with the supply line 23 as shown in FIG. 4. When the spool is in its start position (FIG. 5), however, the passage between the pressure port and the exhaust port is closed by the spool head 33. Then, as the spool is moved to the left by the pilot piston, a radial passage 63 in the spool head 33 moves into the exhaust port 62 to admit exhaust fluid into an axial passage 64 through the stem of the spool to a series of radial passages 65 communicating with the drain port 61.

While the area of the input passage 38 around the spool head 32 controls the rate of delivery of fluid to the head end 27 of the shot cylinder 18, the restrictor 59 in the drain line 60 provides an overriding control on the maximum velocity that can be attained by the shot piston 19 under a given system pressure. Accordingly, the selected effective area of the drain line determines the velocity level at the end 67 (FIG. 6) of the slow shot.

The slow shot is terminated by means responsive to a preselected amount of injection plunger motion and operable to initiate the fast shot at a preselected point in the plunger motion. Herein, this means takes the form of an electrical switch 68 (FIGS. 1, 4 and 5) mounted on the machine frame and having an operator 69 engaging a dog 70 movable with the injection plunger 15 and positioned to trip the switch by movement of the dog off the operator as the injection plunger advances. For this purpose, the dog is an elongated bar paralleling the rod 17 and holding the switch in its open position, the dog being adjustably positioned along the rod so that its free end rides off the switch operator and actuates the switch at a preselected point as the rod moves to the left from the position shown in FIG. 5.

Actuation of the switch 68 activates a valve 71 to open a pilot pressure line 72 communicating between the supply line 23 and a pressure chamber 73 in the valve body 30 at the trailing end of the valve spool thereby admitting pilot pressure fluid to the chamber and urging the spool to the left from its intermediate position and away from the pilot piston at a speed determined by the rate of flow of fluid into the pressure chamber. Herein, the valve 71 is shown as a hydraulically-loaded check valve that opens when the pressure behind the valve is relieved. To permit the faster spool motion during the fast shot, the exhaust port 62 receiving fluid from the rod end of the shot cylinder 18 now communicates not only with the restricted drain port 61 through the passage 63, 64, 65 but also with a second drain port 74 through a passage 75 (FIG. 8) around the chamfered end 77 of the spool head 33. As a result of the more rapid speed of the spool, this passage is opened very quickly and almost immediately permits substantially unrestricted flow from the rod end of the shot cylinder.

The speed of the spool and the resulting rate of acceleration of the injection plunger 15 during the fast shot portion of the stroke are controlled by another adjustable flow restrictor 78 limiting the rate of fluid flow through a line 79 communicating between the sump 21 and with a second exhaust port 79a (FIGS. 4 and 5) opening into a pressure chamber 80 in the valve body holding a body of pressure fluid acting on the end of a head 81 forming the leading end of the spool. By limiting the flow in this line, the maximum speed of the spool under system pressure may be selected and precisely controlled to select the slope of the fast shot line 82 in FIG. 6. This restrictor is incorporated in another hydraulically-loaded check valve 83 which initially is held closed by pressure in a line 84 leading to a control valve 85.

The final control of the injection cycle is the limitation of the maximum velocity of the injection plunger 15 at the end of the fast shot as indicated at 86 in FIG. 6. The level of this line is determined by the maximum rate of fluid flow permitted in the supply line 23 and this rate is controlled by an adjustable restrictor 87 in the supply line. By adjusting the effective size of this restriction, the rate of flow of fluid through the control valve to the head end of the shot cylinder 18 is increased and decreased to raise and lower the final velocity of the piston 19 and the plunger 15. This restrictor is incorporated in a solenoid valve 88 that opens the line 23 to the extent permitted by the restrictor when the valve coil 89 is energized.

As the head 81 on the leading end of the valve spool moves through the pressure chamber 80, it engages the head 90 of a second pilot piston mounted on the left end of the valve body 30 to stop the spool at the end of its stroke. As shown most clearly in FIG. 4, the pilot piston is supported in a manner similar to that of the right-hand pilot piston in a cylinder formed by a hollow cup 91 and a ring 92 bolted to the left end of the valve body with the center bore 93 of the ring opening into the left end of the spool bore 31. The pilot piston has a head 94 on the left end disposed within the pressure chamber 95 defined by the cup, and a pair of axially spaced heads 96 and 97 on its right end portion of equal diameter and sized to fit snugly in the ring bore, the heads being separated by an annular groove 98. A coiled spring 99 is carried in an axial bore 100 in the left end portion of the piston and abuts against the end wall of the cup 91 to urge the piston to the right into the extended position shown in FIG. 4. Between the heads 90 and 97, a radial passage 101 opening into the groove 98 communicates between the spring bore and a port 102 communicating with a pilot pressure passage 103 connected to the supply line 23. A branch passage 104 connects the pilot pressure passage directly to the interior 95 of the cup through a spring-loaded check valve 105.

With this arrangement, the pilot piston yields to the left against the spring 99 as the spool head approaches the end of its bore 31. Initially, the fluid in the pressure chamber 95 is free to flow through the pilot piston to the port 102 to permit movement of the head 94 to the left in the chamber. After the head 90 passes the port 102, however, fluid is trapped in the chamber 95 and thus stops such movement to stop the spool short of the left end of its bore. During the return motion of the spool, the spring 95 returns the pilot piston to its extended position.

*Hydraulic circuit and summary of operation*

The basic elements of a hydraulic circuit for the control are illustrated in FIG. 5. With the dies 11 and 12 closed, the pump 20 running, the accumulator 22 charged, the various flow restrictors 59, 78 and 87 adjusted for the desired flow rates through the respective lines, and the valve spool and the shot piston 15 in the initial positions shown in FIG. 4, a charge of molten metal is ladled into the injection cylinder 14 to fill the latter to the desired level and a start switch 107 is closed to initiate the injection stroke. Closure of this switch energizes the solenoid 108 of the control valve 85 and also activates a timer 109 which times out and opens the dies after a selected time interval sufficient for the completion of the molding cycle. In addition, the coil 89 of the valve 88 is energized, either by the switch 107 or by other means, to admit pressure fluid from the accumulator into the pressure port 24 for the operation of the shot cylinder 18, and also into the pilot line 45 opening into the slow-shot pressure chamber 41 through passages 47 and 48.

When energized, the coil 108 shifts the spool 85a of the valve 85 to the right to close the line 84 leading to the check valve 83 and thereby relieve the pressure loading of the check valve and open the line 79 to the extent permitted by the manually operable adjusting screw constituting the restrictor 78. In addition, pressure fluid is admitted from the pump line 110 to a line 111 leading to a control valve 112 from which pressure is applied to the check valve 71 to close the latter and the pilot line 72.

Accordingly, pilot pressure fluid flows into the slow shot pressure chamber 41 through the line 45 and passages 47 and 48 at the faster rate to shift the pilot piston and the valve spool rapidly to the left out of the initial position and into the start position shown in FIG. 5. The head 81 on the leading end of the spool moves into the pressure chamber 80 and forces fluid therefrom through the exhaust line 79 and past the restrictor 78 which is set to pass a greater rate of flow and thus has no significant effect on the velocity of the spool.

As the pilot piston pushes the valve spool into the start position, the head 55 of the pilot piston enters the ring bore 43 and blocks further flow into the chamber 41 through the unrestricted passage 47 thereby reducing the velocity of the pilot piston and the valve spool to that produced by the flow past the restrictor 49. Accordingly, the spool thereafter is pushed slowly to the left to crack open the input passage 38 (FIGS. 7 and 8) around the spool head 32 and begin admitting fluid from the pressure port 24 into the input port 34 and thus to the head end 27 of the shot cylinder 18 to start the forward stroke of the injection plunger 15. The area of the input passage increases progressively at the slow rate to accelerate the plunger through the slow shot 58.

Fluid exhausted from the rod end 28 of the shot cylinder 18 flows through a line 29 and the exhaust port 62 into the now open passage 63 in the spool head 33 and through the spool to the passage 65 communicating with the restricted drain port 61. As the shot piston 19 is accelerated, the rate of exhaust approaches the maximum rate of flow that the restrictor 59 will pass at system pressure and the velocity of the injection plunger 15 levels off at the selected maximum slow-shot velocity at 67 (FIG. 6).

In the position of the injection plunger 15 selected for the beginning of the fast shot, usually as soon as leading end of the plunger has passed the port 13 in the injection chamber 14, the switch operator 69 drops off the dog 70 to the close the switch 68. This energizes the coil 113 of the control valve 112 to unload the check valve 71 and admit pilot pressure fluid from the supply line 23 through the line 72 leading to the fast-shot pressure chamber 73 at the trailing end of the spool. The rate at which fluid can flow through this line is substantially greater than the flow through the restricted passage 48 to the slow-shot chamber 41. In addition, the spool head 33 now opens the exhaust port 62 to the second drain port 74 to override the speed limitation previously imposed by the restrictor 59. Thus, the spool is pushed to the left at the faster rate selected for the fast shot to increase the rate of opening of the input passage 38 and the rate of acceleration of the injection plunger 15.

During this faster motion, the rate of flow of exhaust fluid out of the pressure chamber 80 increases to the capacity set by the flow restrictor 78 in the exhaust line 79. Thus, the setting of this restrictor controls the rate of spool motion and the rate of fast-shot acceleration of the injection plunger 15 at 82 in FIG. 6.

The head 81 on the leading end of the spool engages the pilot piston head 90 during the slow shot (see FIG. 7) and begins to push the pilot piston to the left against the action of the spring 99. Fluid is displaced from the chamber 95 through the bore 100 and the radial passage 101 in the groove 98 until the piston head 90 closes the port 102. Then the fluid trapped in the chamber 95 stops the piston and the spool with the spool head 81 adjacent the left end of the valve housing 30.

This is the fully open condition of the control valve 25 in which fluid flows to the head end 27 of the shot cylinder 18 at the maximum rate permitted by the setting of the flow restrictor 87 in the supply line 23 and this rate, in turn, determines the maximum velocity of the injection plunger 15 as shown at 86 in FIG. 6. The plunger continues toward the mold cavity 10 until the latter has been filled, and then bottoms against the metal to apply the final molding pressure. This pressure is maintained until the timer 109 times out and opens the dies. It will be seen that the plunger will follow the movable die 12 as the latter moves away from the fixed die 11, thereby ejecting the casting from the fixed die. This follow-up motion is indicated at 114 in FIG. 6. Knock-out pins 115 (FIG. 1) eject the casting from the movable die.

To return the shot piston 19 and the valve spool to their initial positions, a switch 117 (FIG. 1) is opened as the dies open, and this switch opens the start switch 107 which may be held closed during the forward stroke by a relay 107a. Thus, the coil 108 is deenergized to reverse the valve 85. This closes the check valve 83 by admitting pressure fluid from the pump 20 to the line 84. In addition, fluid flows from this line through a check valve 118 to the exhaust line 79 and thus to the pressure chamber 80 at the leading end of the spool to shift the latter back to the right until the head 54 abuts against the ring 44. Fluid is exhausted from the pressure chamber 73 through the pilot line 72 and a branch line 119 communicating with the sump through the valve 85 and return lines 120, 120a and 121. The spring 99 returns the left pilot piston to the position shown in FIG. 4. As the right pilot piston is pushed back to its retracted position by the spool, from the chamber 41 fluid flows through a center passage 122 (FIG. 3) and a check valve 123 to radial passages 124 communicating with the unrestricted passage 47 thereby permitting rapid return of the spool.

As the spool head 33 opens the pressure port 24 to the exhaust port 62, fluid is admitted to the rod end 28 of the shot cylinder 18 to begin the return stroke of the shot piston 19. Fluid forced out of the head end 27 flows out through line 35, the input port 34, the passages 65, 64 and 63 in the spool, and the drain port 74, as will be seen in FIG. 4, until the shot piston and the valve spool reach their original positions shown in FIG. 4. During this return stroke the dog 70 engages the operator 69 and opens the switch 68 to deenergize the coil 113 of valve 112 thereby closing the valve 71. This leaves the hydraulic circuit in condition for the starting of the next cycle upon closing of the switch 107.

As an optional feature of the control, an adjustable flow restrictor 125 is provided in the pilot pressure line 72 to regulate the maximum rate of flow to the fast-shot chamber 73. By suitable electrical controls (not shown), the coil 113 of the valve 112 may be energized along with the coil 108 of the valve 85 at the beginning of the cycle to produce a controlled fast shot throughout the stroke of the injection plunger 15. In this case, the flow restrictor 78 is fully opened and the restrictor 125 alone controls the rate of motion of the valve spool by controlling the flow to the fast-shot chamber. The restrictor 125 is fully open during the normal variable speed cycle.

I claim as my invention:

1. In a hydraulic system, the combination of, a hydraulic actuator having input and exhaust ends; a control valve comprising a hollow body and a valve member movable within said body along a predetermined path from a start position through an intermediate position to a final position, said body having an input port communicating with said input end, an exhaust port communicating with said exhaust end, first and second drain ports, and a pressure port for admitting fluid under pressure into the body, said ports being spaced along said path; means on said valve member for progressively opening said pressure port to said input port as said member moves along said path thereby to admit pressure fluid to said input end at a rate that increases as the member moves along said path; means on said valve member for opening said first drain port to said exhaust port to receive fluid from exhaust end as the member moves toward said intermediate position, and opening said second drain port to said exhaust end as the member moves from said intermediate position toward said final position; means for moving said valve member from said start position to said intermediate position at a relatively slow speed for slow acceleration of said actuator, and from said intermediate position to said final position at a faster speed for faster acceleration of said actuator; a flow restrictor for limiting the maximum rate of flow through said first drain port and thereby limiting the maximum velocity of said actuator as said member moves from said start position to said intermediate position and until said second drain port is opened to said exhaust port to permit a greater flow of fluid from said exhaust end; said valve body having a pressure chamber therein for holding a body of pressure fluid in contact with a leading surface of said member and a second exhaust port for receiving the flow from said chamber as the member moves along said path and into the chamber; a selectively adjustable flow restrictor for regulating the maximum rate of flow through said second exhaust port thereby to adjust the speed of the member and the rate of acceleration of said actuator; and a selectively adjustable flow restrictor for regulating the maximum rate of flow to said pressure port thereby to adjust the final velocity of said actuator when said pressure port is fully open to said input port.

2. In a hydraulic system, the combination of, a hydraulic actuator having input and exhaust ends; a control valve comprising a hollow body and a valve member movable within said body along a predetermined path from a start position through an intermediate position to a final position, said body having an input port communicating with said input end, an exhaust port communicating with said exhaust end, first and second drain ports, and a pressure port for admitting fluid under pressure into the body, said ports being spaced along said path; means on said valve member for progressively opening said pressure port to said input port as said member moves along said path thereby to admit pressure fluid to said input end at a rate that increases as the member moves along said path, means on said valve member for opening said first drain port to said exhaust port to receive fluid from exhaust end as the member moves toward said intermediate position, and opening said second drain port to said exhaust end as the member moves from said intermediate position toward said final position; means for moving said valve member from said start position to said intermediate position at a relatively slow speed for slow acceleration of said actuator, and from said intermediate position to said final position at a faster speed for faster acceleration of said actuator; a flow restrictor for limiting the maximum rate of flow through said first drain port and thereby limiting the maximum velocity of said actuator as said member moves from said start position to said intermediate position and until said second drain port is opened to said exhaust port to permit a greater flow of fluid from said exhaust end; said valve body having a pressure chamber therein for holding a body of pressure fluid in contact with a leading surface of said member and a second exhaust port for receiving the flow from said chamber as the member moves along said path and into the chamber; and a selectively adjustable flow restrictor for regulating the maximum rate of flow through said second exhaust port thereby to adjust the speed of the member and the rate of acceleration of said actuator.

3. In a hydraulic system, the combination of, a hydraulic actuator having input and exhaust ends; a control valve comprising a hollow body and a valve member movable within said body along a predetermined path from a start position through an intermediate position to a final position, said body having an input port communicating with said input end, an exhaust port communicating with said exhaust end, first and second drain ports, and a pressure port for admitting fluid under pressure into the body, said ports being spaced along said path; means on said valve member for progressively opening said pressure port to said input port as said member moves along said path thereby to admit pressure fluid to said input end at a rate that increases as the member moves along said path; means on said valve member for opening said first drain port to said exhaust port to receive fluid from exhaust end as the member moves toward said intermediate position, and opening said second drain port to said exhaust end as the member moves from said intermediate position toward said final position; means for moving said valve member from said start position to said intermediate position at a relatively slow speed for slow acceleration of said actuator, and from said intermediate position to said final position at a faster speed for faster acceleration of said actuator; a flow restrictor for limiting the maximum rate of flow through said first drain port and thereby limiting the maximum velocity of said actuator as said member moves from said start position to said intermediate position and until said second drain port is opened to said exhaust port to permit a greater flow of fluid from said exhaust end; and a selectively adjustable flow restrictor for regulating the maximum rate of flow to said pressure port thereby to adjust the final velocity of said actuator when said pressure port is fully open to said input port.

4. In a hydraulic system, the combination of, a hydraulic actuator having input and exhaust ends; a control valve comprising a hollow body and a valve member movable within said body along a predetermined path from a start position through an intermediate position to a final position, said body having an input port communicating with said input end, an exhaust port communicating with said exhaust end, first and second drain ports, and a pressure port for admitting fluid under pressure into the body, said ports being spaced along said path; means on said valve member for progressively opening said pressure port to said input port as said member moves along said path thereby to admit pressure fluid to said input end at a rate that increases as the member moves along said path; means on said valve member for opening said first drain port to said exhaust port to receive fluid from exhaust end as the member moves toward said intermediate position, and opening said second drain port to said exhaust end as the member moves from said intermediate position toward said final position; a hydraulic cylinder on said body at the trailing end of said valve member; a pilot piston guided in said cylinder for movement from a retracted position toward said trailing end to push said member from said start position to said intermediate position; means for admitting pressure fluid into said cylinder at a preselected rate to advance said pilot piston and shift said member to said intermediate position at a relatively slow speed for slow acceleration of said actuator; said body having a pressure chamber therein at the trailing end of said member in said intermediate position; means for admitting pilot pressure fluid into said pressure chamber after said member reaches said intermediate position at a rate sufficient to advance said member toward said final position at a faster speed for faster acceleration of said actuator; a flow restrictor for limiting the maximum rate of flow through said first drain port and thereby limiting the maximum velocity of said actuator as said member moves from said start position to said intermediate position and until said second drain port is opened to said exhaust port to permit a greater flow of fluid from said exhaust end; said valve body having a second pressure chamber therein for holding a body of pressure fluid in contact with a leading surface of said member and a second exhaust port for receiving the flow from said second chamber as the member moves along said path and into said second chamber; and a selectively adjustable flow restrictor for regulating the maximum rate of flow through said second exhaust port thereby to adjust the speed of said member and the rate of acceleration of said actuator.

5. In a hydraulic system, the combination of, a hydraulic actuator having input and exhaust ends; a control valve comprising a hollow body and a valve member movable within said body along a predetermined path from a start position through an intermediate position to a final position, said body having an input port communicating with said input end, an exhaust port communicating with said exhaust end, first and second drain ports, and a pressure port for admitting fluid under pressure into the body, said ports being spaced along said path; means on said valve member for progressively opening said pressure port to said input port as said member moves along said path thereby to admit pressure fluid to said input end at a rate that increases as the member moves along said path; means on said valve member for opening said first drain port to said exhaust port to receive fluid from exhaust end as the member moves toward said intermediate position, and opening said second drain port to said exhaust end as the member moves from said intermediate position toward said final position; a hydraulic cylinder on said body at the trailing end of said valve member; a pilot piston guided in said cylinder for movement from a retracted position toward said trailing end to push said member from said start position to said intermediate position; means for admitting pressure fluid into said cylinder at a preselected rate to advance said pilot piston and shift said member to said intermediate position at a relatively slow speed for slow acceleration of said actuator; said body having a pressure chamber therein at the trailing end of said member in said intermediate position; means for admitting pilot pressure fluid into said pressure chamber after said member reaches said intermediate position at a rate sufficient to advance said member toward said final position at a faster speed for faster acceleration of said actuator; and a flow restrictor for limiting the maximum rate of flow through said first drain port and thereby limiting the maximum velocity of said actuator as said member moves from said start position to said intermediate position and until said second drain port is opened to said exhaust port to permit a greater flow of fluid from said exhaust end.

6. In a hydraulic system, the combination of, a hydraulic actuator having input and exhaust ends; a control valve comprising a hollow body and a valve member movable within said body along a predetermined path from a start position through an intermediate position to a final position, said body having an input port communicating with said input end, an exhaust port communicating with said exhaust end, first and second drain ports, and a pressure port for admitting fluid under pressure into the body, said ports being spaced along said path; means on said valve member for progressively opening said pressure port to said input port as said member moves along said path thereby to admit pressure fluid to said input end at a rate that increases as the member moves along said path; means on said valve member for opening said first drain port to said exhaust port to receive fluid from exhaust end as the member moves toward said intermediate position, and opening said second drain port to said exhaust end as the member moves from said intermediate position toward said final position; a hydraulic cylinder on said body at the trailing end of said valve member; a pilot piston guided in said cylinder for movement from a retracted position toward said trailing end to push said member from said start position to said intermediate position; means for admitting pressure fluid into said cylinder at a preselected rate to advance said pilot piston and shift said member to said intermediate position at a relatively slow speed; additional means for moving said member from said intermediate position to said final position at a faster speed for faster acceleration of said actuator; and a flow restrictor for limiting the maximum rate of flow through said first drain port and thereby limiting the maximum velocity of said actuator as said member moves from said start position to said intermediate position and until said second drain port is opened to said exhaust port to permit a greater flow of fluid from said exhaust end.

7. In a hydraulic system, the combination of, a hydraulic actuator having input and exhaust ends; a control valve comprising a hollow body and a valve member movable within said body along a predetermined path from a start position through an intermediate position to a final position, said body having an input port communicating with said input end, an exhaust port communicating with said exhaust end, first and second drain ports, and a pressure port for admitting fluid under pressure into the body, said ports being spaced along said path; means on said valve member for progressively opening said pressure port to said input port as said member moves along said path thereby to admit pressure fluid to said input end at a rate that increases as the member moves along said path; means on said valve member for opening said first drain port to said exhaust port to receive fluid from exhaust end as the member moves toward said intermediate position, and opening said second drain port to said exhaust end as the member moves from said intermediate position toward said final position; means for moving said valve member from said start position to said intermediate position at a relatively slow speed for slow acceleration of said actuator, and from said intermediate position to said final position at a faster speed for faster acceleration of said actuator; and a flow restrictor for limiting the maximum rate of flow through said first drain port and thereby limiting the maximum velocity of said actuator as said member moves from said start position to said intermediate position and until said second drain port is opened to said exhaust port to permit a greater flow of fluid from said exhaust end.

8. In a hydraulic system, the combination of, a hydraulic actuator having input and exhaust ends; a control valve having a valve member movable along a predetermined path from a start position through an intermediate position to a final position, said valve having an input port communicating with said input end, an exhaust port communicating with said exhaust end, a pressure port for admitting fluid under pressure to the valve, and first and second drain ports; means in said valve for progressively opening said pressure port to said input port as said member moves along said path to admit pressure fluid to said input end at a rate that increases as the member moves along said path; means for shifting said valve progressively along said path at a selectively varying speed to vary the rate of acceleration of said actuator; means in said valve for establishing communication between said exhaust port and said first drain port to receive fluid from said exhaust end as said member moves from said start position to said intermediate position and establishing communication between said exhaust port and said second drain port as said member moves from said intermediate position to said final position; selectively variable means for limiting the maximum rate of flow through said exhaust port under a given pressure and thereby controlling the maximum velocity attained by said actuator when said member is in said intermediate position; and selectively variable means for controlling the maximum rate of flow of fluid to said input port and thereby limiting the maximum velocity of said actuator when said member is in said final position.

9. In a hydraulic system, the combination of, a hydraulic actuator having input and exhaust ends; a control valve having a valve member movable along a predetermined path, said valve having an input port communicating with said input end, an exhaust port communicating with said exhaust end, a pressure port for admitting fluid under pressure to the valve, and a drain port; means in said valve for progressively opening said pressure port to said input port as said member moves along said path to admit pressure fluid to said input end at a rate that increases as the member moves along said path; means for shifting said valve progressively along said path at a selectively varying speed to vary the rate of acceleration of said actuator; means in said valve for establishing communicating between said exhaust port and said drain port as said member moves along said path to receive fluid from said exhaust end; and selectively variable means for limiting the maximum rate of flow through said exhaust port under a given pressure and thereby controlling the maximum velocity of said actuator.

References Cited

UNITED STATES PATENTS

| 1,905,133 | 4/1933 | Bishop et al. | 91—355 |
| 2,917,026 | 12/1959 | Hall et al. | 91—359 |

FOREIGN PATENTS 192,991   12/1937   Switzerland.

MARTIN P. SCHWADRON, *Primary Examiner.*

PAUL E. MASLOUSKY, *Examiner.*